US008731079B2

(12) United States Patent
Ye

(10) Patent No.: US 8,731,079 B2
(45) Date of Patent: May 20, 2014

(54) HIGH-DENSITY MULTI-CHANNEL QAM MODULATOR USING AN IDFT/IFFT AND POLYPHASE FILTER BANK

(75) Inventor: Zhuan Ye, Fremont, CA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 204 days.

(21) Appl. No.: 13/204,450

(22) Filed: Aug. 5, 2011

(65) Prior Publication Data

US 2013/0034189 A1 Feb. 7, 2013

(51) Int. Cl.
*H04K 1/10* (2006.01)
*H04L 27/28* (2006.01)

(52) U.S. Cl.
USPC ............... 375/260; 375/267; 375/295

(58) Field of Classification Search
CPC .... H04L 27/264; H04L 27/2697; H04L 27/36
USPC .................. 375/260, 267, 295, 298
See application file for complete search history.

(56) References Cited

U.S. PATENT DOCUMENTS

| 6,091,932 | A * | 7/2000 | Langlais | 725/111 |
| 2005/0114903 | A1 * | 5/2005 | Ahmed et al. | 725/114 |
| 2010/0202775 | A1 * | 8/2010 | Agazzi | 398/76 |
| 2012/0321010 | A1 * | 12/2012 | Laudel | 375/267 |

* cited by examiner

*Primary Examiner* — Chieh M Fan
*Assistant Examiner* — Freshteh N Aghdam
(74) *Attorney, Agent, or Firm* — Troy A. Van Aacken

(57) ABSTRACT

Methods and apparatuses are provided for increasing the frequency resolution of a multi-channel QAM modulator and using a novel IDFT/IFFT and polyphase filter bank architecture to provide a more computationally efficient and high density multi-channel QAM modulator. The implementations of the improved multi-channel QAM modulator modulate QAM symbol streams onto respective carrier signals where the frequency of each carrier signal is an integer multiple of a fraction of the input sample rate of the respective QAM symbol stream. The modulated carriers are then combined using a novel IDFT/IFFT and polyphase filter bank architecture.

8 Claims, 10 Drawing Sheets

HIGH-DENSITY MULTI-CHANNEL QAM MODULATOR USING AN IDFT/IFFT AND POLYPHASE FILTER BANK

TECHNICAL FIELD

This disclosure is related to a high-density multi-channel QAM modulator that uses an IDFT/IFFT and a polyphase filter bank.

BACKGROUND

In a communication system, information is transmitted via message signals through a physical medium from a source to a destination. For example, a cable-based system can be used to deliver high-definition digital entertainment and telecommunications such as video, voice, and high-speed Internet services from a headend to subscribers over an existing cable television network. The cable television network can take the form of an all-coax, all-fiber, or hybrid fiber/coax (HFC) network.

The message signals conveying the information to be transmitted can undergo modulation prior to transmission. Modulation generally is the process of converting the message signal into a form that can be transmitted over the physical medium. This can be achieved, for example, by superimposing the message signals on a carrier signal that is suitable for transmission over the physical medium. In a cable-based system, for example, digital bit streams representing various services (e.g., video, voice, and Internet) from various digital information sources are received at the headend where each digital bit stream is QAM modulated onto a respective carrier signal having a frequency that corresponds to a center frequency of a 6 MHz-wide RF channel to produce a single channel modulated RF carrier signal.

A plurality of single channel modulated carrier signals can be combined to produce a multi-channel signal. The multi-channel signal can be converted to an optical signal and transmitted downstream via a fiber to a fiber node that serves a group of end users ("service group"). The fiber node can include an optical receiver that converts the received optical signal to an electrical signal that then is transmitted to the service group, for example, via receiving devices such as cable modems (CMs) and/or settop boxes (STBs).

There is a growing demand for multi-channel modulators that can accommodate more channels; however, existing multi-channel modulators are computationally inefficient, among other limitations.

DETAILED DESCRIPTION

Various implementations of this disclosure increase the frequency resolution of a multi-channel QAM modulator and uses a novel IDFT/IFFT and polyphase filter bank architecture to provide a more computationally efficient and high density multi-channel QAM modulator. The implementations of the improved multi-channel QAM modulator of this disclosure modulate QAM symbol streams onto respective carrier signals where the frequency of each carrier signal is an integer multiple of a fraction of the input sample rate of the respective QAM symbol stream. In this way, implementations of the improved multi-channel QAM modulator of this disclosure can efficiently support more channels. The modulated carriers are then combined using a novel IDFT/IFFT and polyphase filter bank architecture.

Although this disclosure makes reference to a cable-based system and QAM modulators, this disclosure is not intended to be limited to a cable-based system or QAM modulators.

Figure 1:
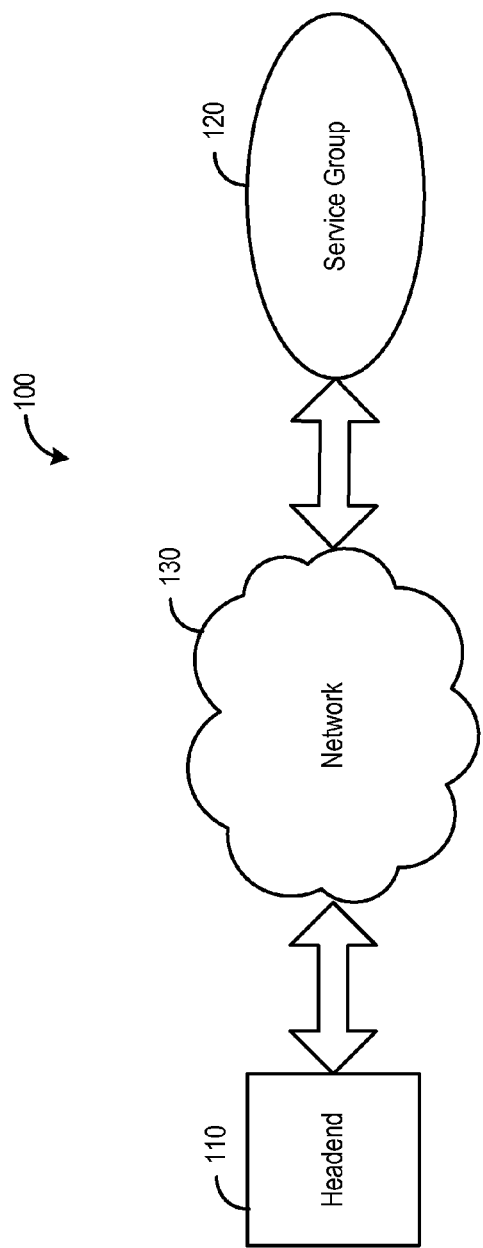
FIG. 1 is a block diagram illustrating an example cable-based system used to provide communications between a headend and a service group of receiving devices over a cable network.

FIG. 1 illustrates an example cable-based system 100 operable to deliver high-definition digital entertainment and telecommunications such as video, voice, and high-speed Internet services over a cable network 130 between a headend 110 and a service group of receiving devices such as cable modems (CMs) and/or settop boxes (STBs) 120.

Digital bit streams representing various services (e.g., video, voice, and Internet) from various digital information sources are received at the headend 110 and combined and converted to multi-channel optically modulated signals for transmission over the cable network 130. The cable network 130 can take the form of an all-coax, all-fiber, or hybrid fiber/coax (HFC) network.

Figure 2:
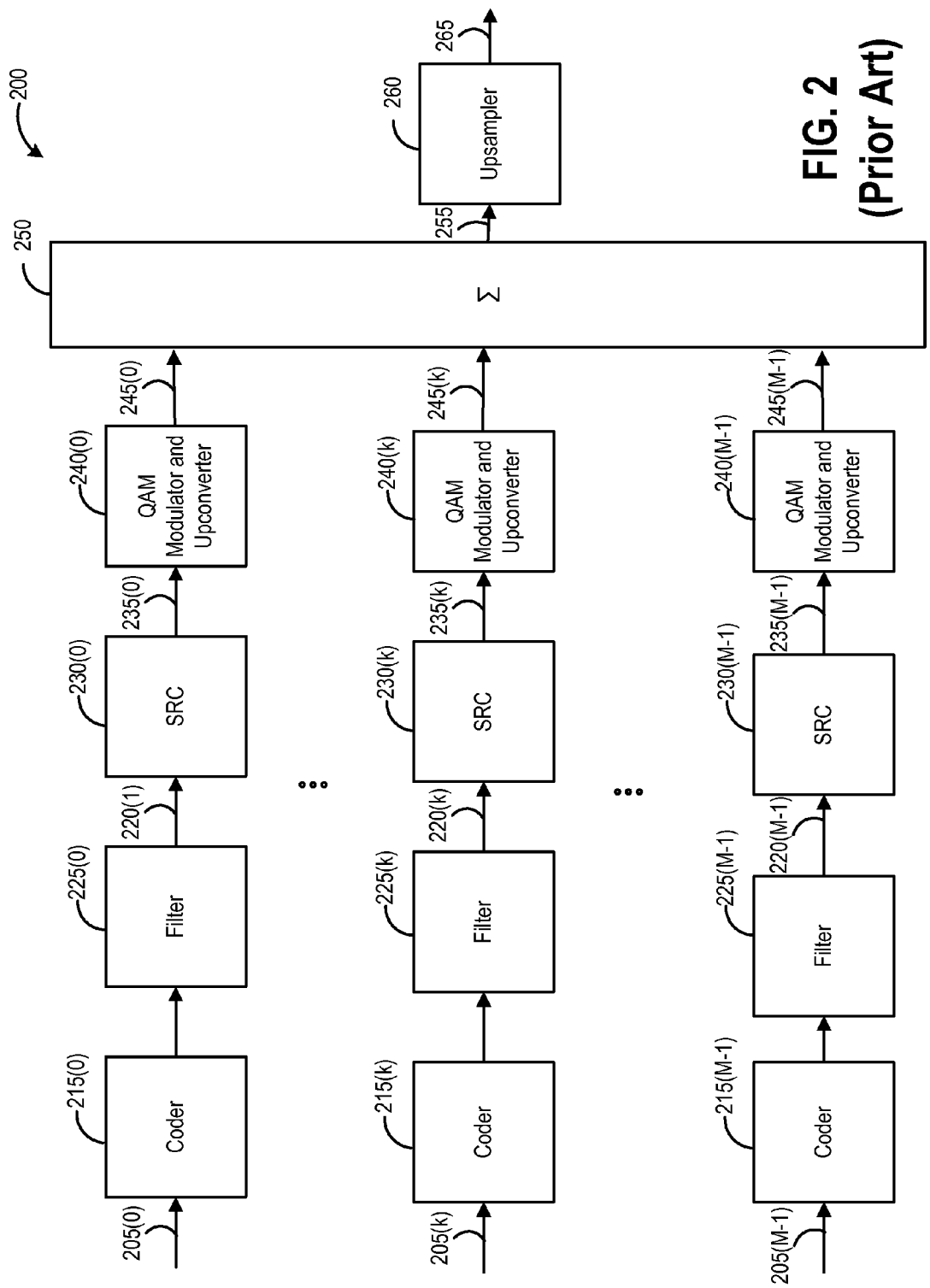
FIG. 2 is a block diagram illustrating an example existing multi-channel QAM modulator.

FIG. 2 illustrates an example existing multi-channel QAM modulator 200 that converts a plurality of single-channel digital bit streams 205(0), . . . , 205(M−1) to a multi-channel signal 255.

For each digital bit stream 205(k), k=0, . . . , M−1, a channel coder 215(k) and root-nyquist filter 225(k) encodes and filters the digital bit stream 205(k) to produce a corresponding quadrature amplitude modulation (QAM) symbol stream 220(k), for example, as specified in ITU-T Recommendation J.83 (12/07), Annex B [ITU-T J.83-B], "Digital multi-programme systems for television sound and data services for cable distribution."

The sample rate of each of the QAM symbol streams 220(k), k=0, . . . , M−1, is then converted by a corresponding sample rate converter (SRC) 230(k) to a common sample rate, $f_s$. Each of the resulting QAM symbol streams 235(k), k=0, . . . , M−1, then is modulated onto a respective carrier signal having a frequency $f_k$ that corresponds to a center frequency of a band-limited channel (e.g., 6 MHz and/or 8 MHz-wide channel) by a respective digital QAM modulator and upconverter $240(k)$, k=0, ..., M−1.

Figure 3:
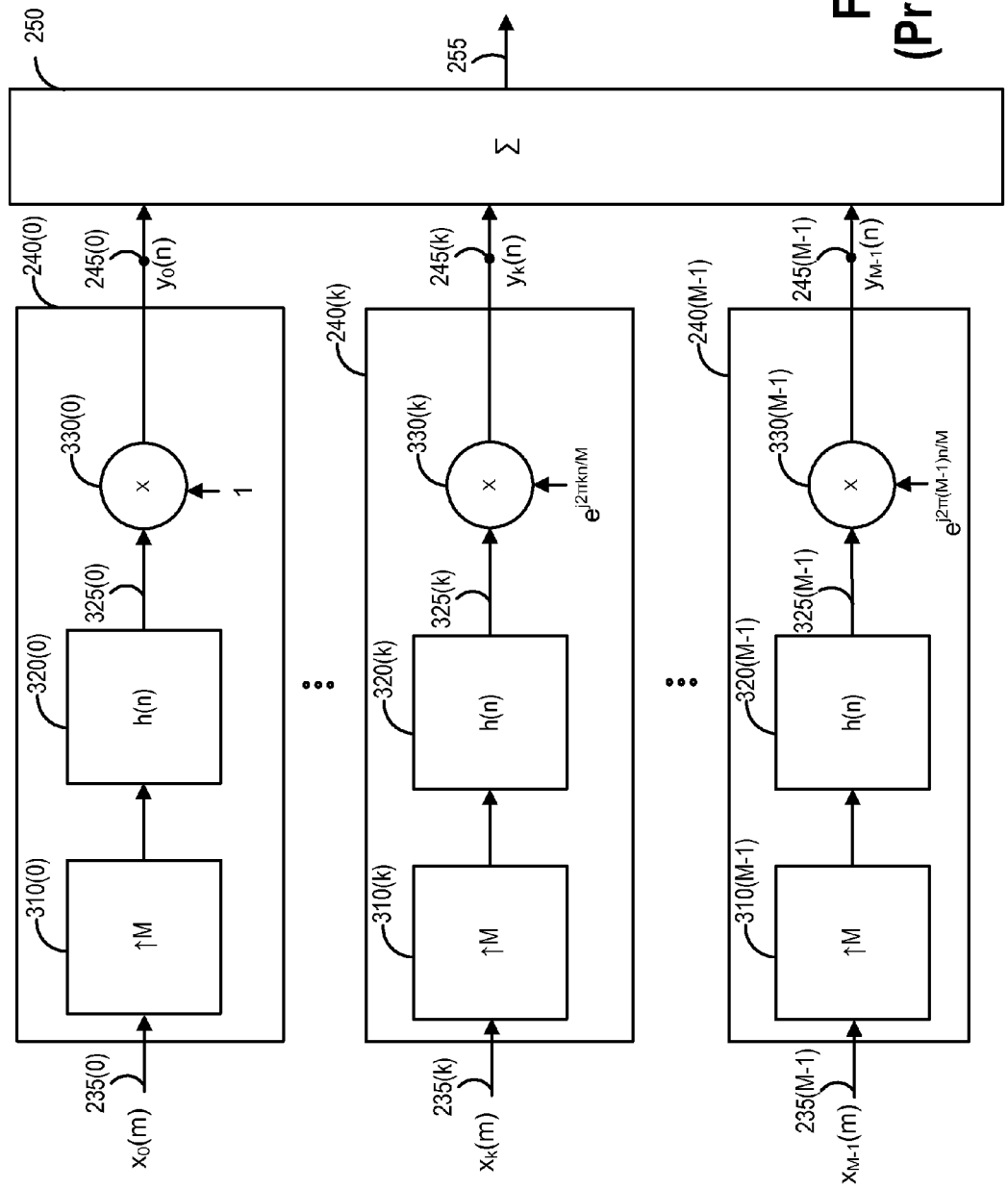
FIG. 3 is a block diagram illustrating example mathematical models of the QAM modulator and upconverters of the multi-channel QAM modulator of FIG. 2.

FIG. 3 illustrates example mathematical models of the QAM modulator and upconverters $240(k)$, k=0, ..., M−1, of FIG. 2. The mathematical models have been normalized by the common sample rate, $f_s$.

As shown in FIG. 3, each of the input QAM symbol streams $235(k)$ is upsampled by a factor of M by upsampler $310(k)$ and then filtered by an anti-image filter $320(k)$, k=0, ..., M−1, respectively. Each of the resulting signals $325(k)$ then is QAM modulated $330(k)$ onto a carrier signal represented by $$e^{j\frac{2\pi}{M}kn},$$

k=0, ..., M−1, respectively, where the carrier signal has a frequency index k, since the mathematical model has been normalized by the common sample rate, $f_s$. For implementation efficiency, the frequency $f_k$ of the carrier signal, which corresponds to the center frequency of the k-th channel, equals an integer multiple of the common sample rate, $f_s$. For example, $f_k$ can equal k×$f_s$. Thus, the channel spacing between channels of the modulated signals $245(k)$, k=0, ..., M−1, is constant and equal to $f_s$.

As shown in FIGS. 2 and 3, the single-channel modulated signals $245(0)$, ..., $245(M−1)$ can be combined by a combiner 250 to produce a multi-channel modulated signal 255.

Returning to FIG. 2, the multi-channel signal 255 then can be upsampled by upsampler 260 to generate a data stream 265 at the desired sample rate for a digital to analog converter (DAC). The upsampled signal 265 can be converted to an analog signal by a DAC (not shown), and an optical transmitter (not shown) converts the analog signal to an optical signal for transmission over the cable network 130 to a service group 120.

As shown above, existing multi-channel modulators, such as the multi-channel QAM modulators 200 of FIGS. 2 and 3, are computationally intensive. Furthermore, as the number or required channels increases, these existing modulators become computationally inefficient.

Figure 6:
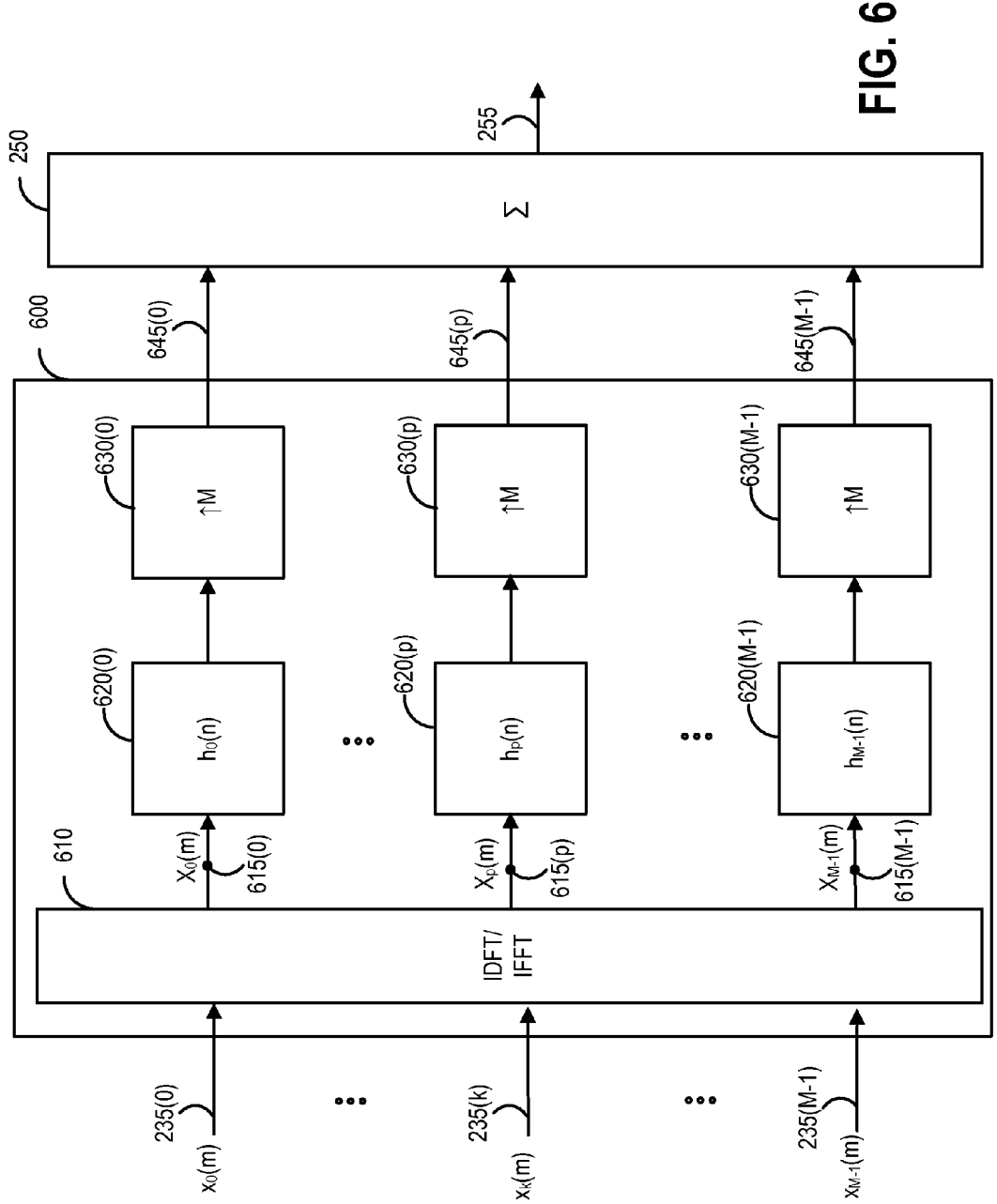
FIG. 6 is a block diagram illustrating a multi-channel QAM modulator using a IDFT/IFFT processing unit and polyphase filter bank.

Attempts have been made to reduce the complexity of these modulators by recognizing that the QAM modulator and upconverters $240(0)$, ..., $240(M−1)$ in FIGS. 2 and 3 can be replaced with an inverse discrete Fourier transform (IDFT)/inverse fast Fourier transform (IFFT) processing unit 600 as shown in FIG. 6.

More specifically, referring to FIG. 3, each of the outputs $y_k(n)$ $245(k)$ of the QAM modulator and upconverters $240(k)$, k=0, ..., M−1, can be represented by the following equation:

$$y_k(n) = \sum_{m=-\infty}^{m=+\infty} x_k(m) h(n - mM) e^{j2\pi \frac{kn}{M}}. \quad (1)$$

Equation (1) can be re-written as follows:

$$y_k(n) = \sum_{m=-\infty}^{m=+\infty} x_k(m) e^{j2\pi \frac{kmM}{M}} h(n - mM) e^{j2\pi \frac{k(n-mM)}{M}} \quad (2)$$

$$= \sum_{m=-\infty}^{m=+\infty} x_k(m) h(n - mM) e^{j2\pi \frac{k(n-mM)}{M}}.$$

Figure 4:
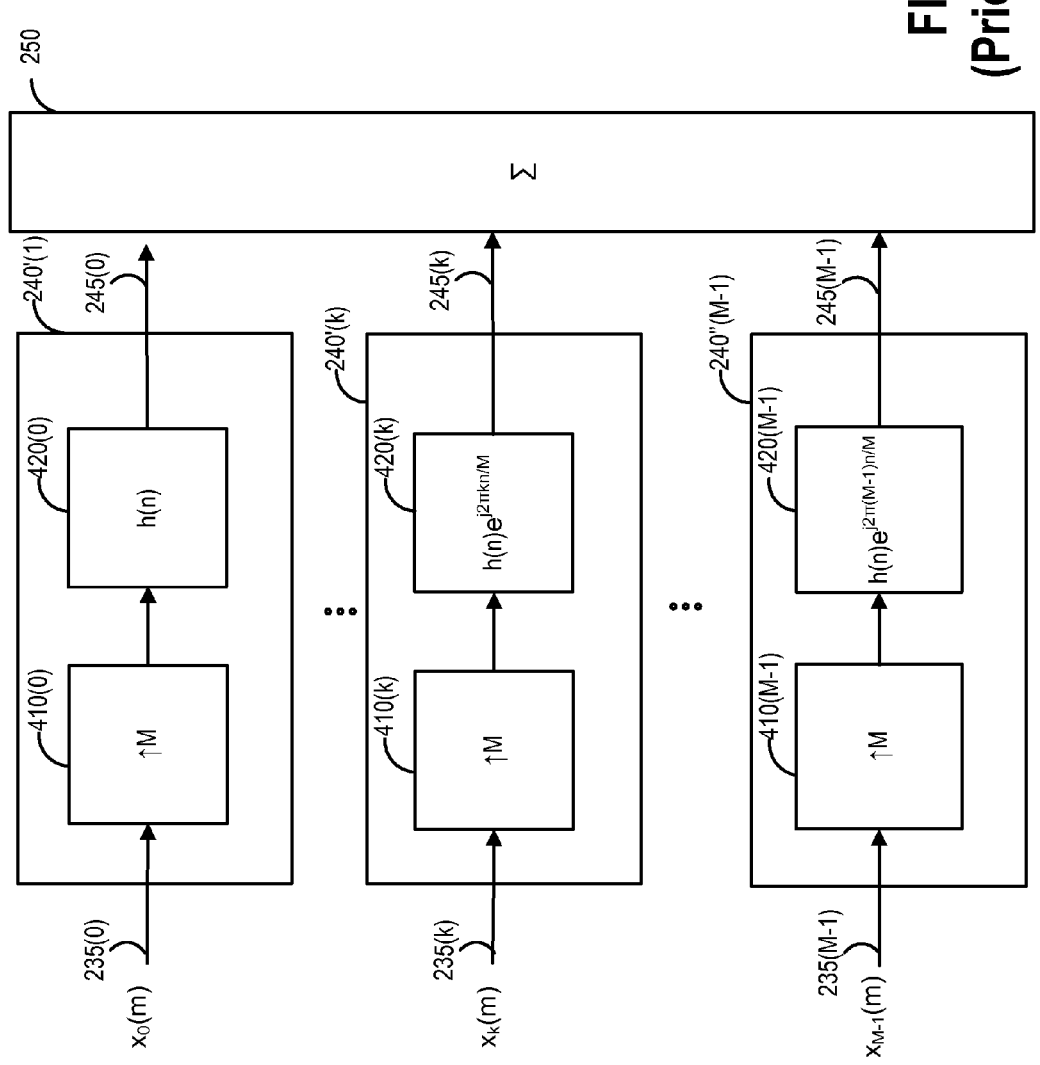
FIG. 4 is a block diagram illustrating an alternate representation of the QAM modulator and upconverters of FIG. 3.

Based on equation (2), the QAM modulator and upconverters $240(k)$, k=0, ..., M−1, of FIG. 3, can be represented by the QAM modulator and upconverters $240'(k)$, k=0, ..., M−1, of FIG. 4.

Figure 5:
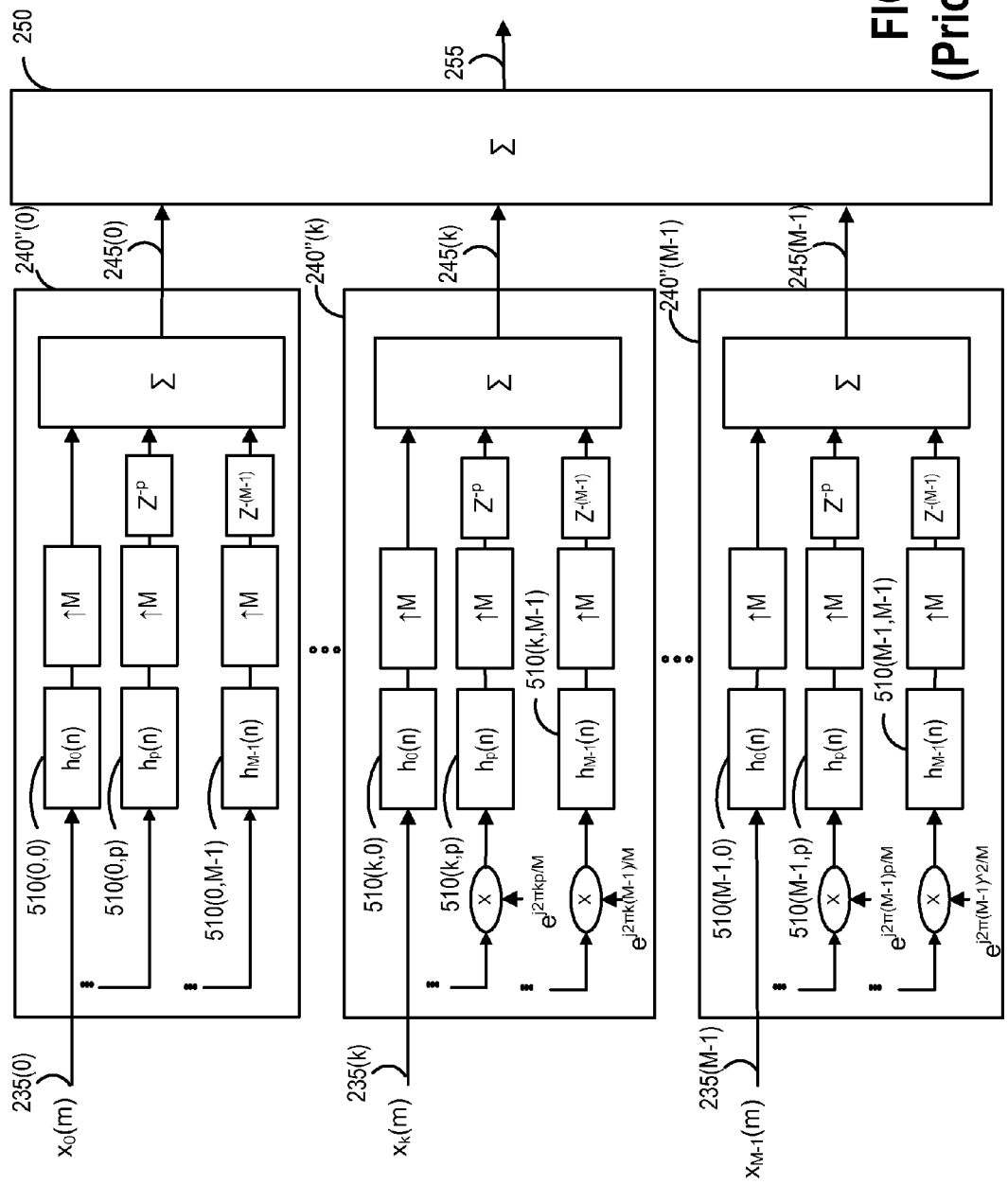
FIG. 5 is a block diagram illustrating polyphase filter bank representations of the QAM modulator and upconverters of FIG. 4.

The QAM modulator and upconverters $240'(k)$, k=0, ..., M−1, of FIG. 4 can be represented by the respective polyphase filter banks $240''(k)$, k=0, ..., M−1, of FIG. 5.

For each polyphase filter bank $240''(k)$, $h_p(n)$ $510(k, p)$, p=0, ..., M−1, are the polyphase subfilters of h(n).

The p-th IFFT, $X_p(m)$, of the input sequence $[x_0(m)$ $235(0)$, ..., $x_{M-1}(m)$ $235(M−1)]$ equals $$X_p(m) = \sum_{k=0}^{k=M-1} x_k(m) e^{j\frac{2\pi}{M}kp}. \quad (3)$$

Because the polyphase subfilters $h_p(n)$ $510(k, p)$, p=0, ..., M−1, are equivalent across the polyphase filter banks $240''(k)$, k=0, ..., M−1, signals can be easily combined across the polyphase filter banks $240''(k)$. Thus, the separate polyphase filter banks $240''(0)$, ..., $240''(M−1)$ of FIG. 5 can be replaced with the IDFT/IFFT processing unit 600 of FIG. 6 in view of equation (3).

The IDFT/IFFT processing block 610 of FIG. 6 produces an M-point IFFT $X_p(m)$ $615(p)$, p=0, ..., M−1, of the input samples $[x_0(m)$ $235(0)$, ..., $x_{M-1}(m)$ $235(M−1)]$. Each of the IFFT outputs $X_p(m)$ is filtered by the polyphase subfilter $h_p(n)$ $620(p)$, p=0, ..., M−1, respectively. The outputs of polyphase subfilters $h_0(n)$ $620(0)$, ..., $h_{M-1}(n)$ $620(M−1)$ are then upsampled by upsamplers $630(0)$, ..., $630(M−1)$, respectively, to produce signals $645(0)$, ..., $645(M−1)$, which are combined by a combiner 250 to produce a multi-channel modulated signal 255.

Although, the IDFT/IFFT processing unit 600 of FIG. 6 theoretically may help to reduce the complexity of multi-channel modulators, it is impractical to implement a multi-channel QAM modulator using the IFFT processing unit 600 of FIG. 6. For example, referring to FIG. 2, assume that the sample rate of a QAM symbol stream $220(k)$ is 5.360537 MHz as specified in ITU-T J.83-B for 256QAM modulation. As discussed above, the channel spacing between channels of the signals $245(0)$, ..., $245(M−1)$ equals the sample rate $f_s$ of the inputs signals $235(0)$, ..., $235(M−1)$. For a required channel spacing of 6-MHz, the SRC $230(k)$ must convert the sample rate of the QAM symbol stream $220(k)$ from 5.360537 MHz to 6 MHz. It would be cost-prohibitive to implement such a SRC due, for example, to the required rectangular filter frequency response of such a SRC.

Thus, a practical multi-channel QAM modulator that is computationally efficient and can accommodate a high number of channels can be desirable.

Figure 7:
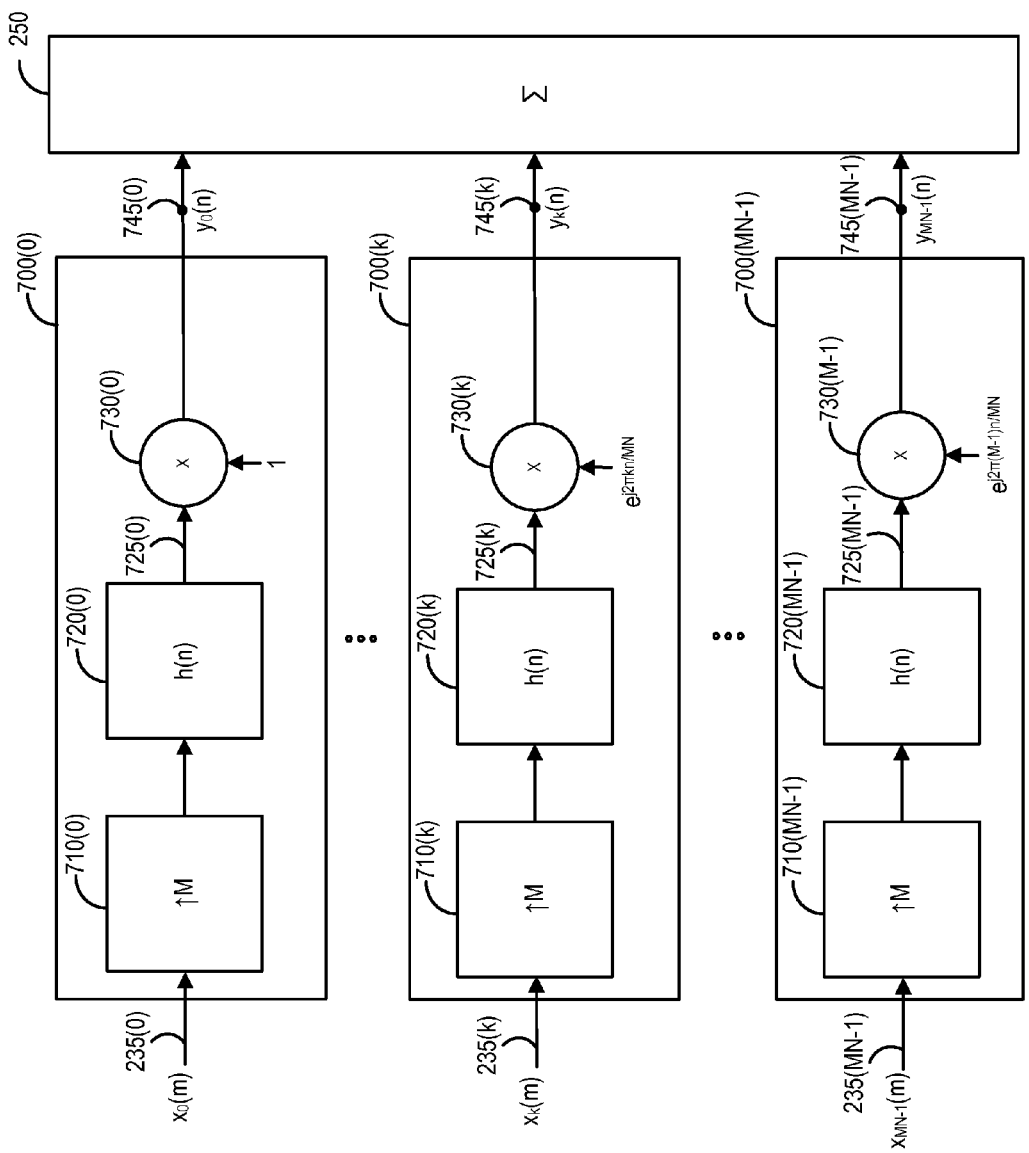
FIG. 7 is a block diagram illustrating example improved mathematical models of the QAM modulator and upconverters of the multi-channel QAM modulator of FIG. 2.

FIG. 7 illustrates example improved mathematical models $700(k)$ of the QAM modulator and upconverters $240(k)$ of FIG. 2. As will be shown below, this improved model can lead to a more computationally efficient and high density multi-channel QAM modulator. The mathematical models $700(k)$ have been normalized by the common sample rate, $f_s$.

As shown in FIG. 7, each of the input QAM symbol streams $235(k)$ is upsampled by a factor of M by upsampler $710(k)$ and then filtered by an anti-image filter $720(k)$. Each of the resulting signals 725(k) then is QAM modulated 730(k) onto a carrier signal represented by $$e^{j\frac{2\pi}{MN}kn},$$

where the carrier signal has a frequency index k. The frequency $f_k$ of the carrier signal, which corresponds to the center frequency of the k-th channel, equals an integer multiple of a fraction (e.g., 1/N) of the common sample rate, $f_s$. For example, $f_k$ can equal $$k \times \frac{f_s}{N}.$$

Thus, unlike the channel spacing between channels of the QAM modulator and upconverters 240(k) of FIG. 3, the channel spacing between channels of the improved QAM modulator and upconverters 700(k) does not equal $f_s$. Instead, the channel spacing between channels of the improved QAM modulator and upconverters 700(k) can be an integer multiple of a fraction (e.g., 1/N) of $f_s$. This can permit more channels in the available frequency spectrum as represented in FIG. 7, which illustrates MN−1 channels (i.e., k=0, . . . , MN−1).

Each of the outputs $y_k$(n) 745(k) of QAM modulator and upconverters 700(k), k=0, . . . , MN−1, respectively, can be represented by the following equation:

$$y_k(n) = \sum_{m=-\infty}^{m=+\infty} x_k(m) h(n-mM) e^{j2\pi \frac{kn}{MN}}. \quad (4)$$

Equation (4) can be re-written as follows:

$$y_k(n) = \sum_{m=-\infty}^{m=+\infty} x_k(m) e^{j2\pi \frac{kmM}{MN}} h(n-mM) e^{j2\pi \frac{k(n-mM)}{MN}} \quad (5)$$

$$= \sum_{m=-\infty}^{m=+\infty} x_k(m) e^{j2\pi \frac{km}{N}} h(n-mM) e^{j2\pi \frac{k(n-mM)}{MN}}.$$

Figure 8:
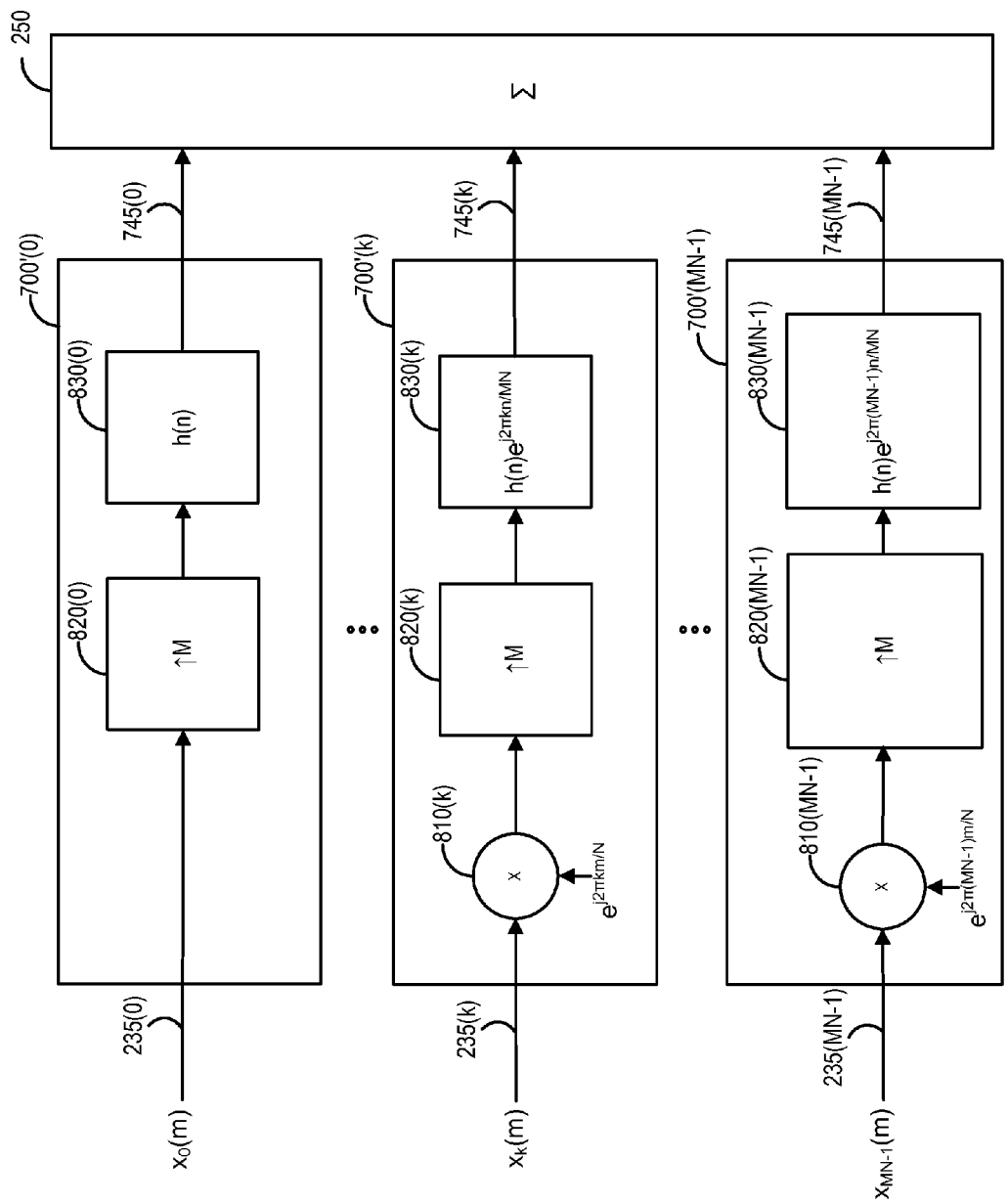
FIG. 8 is a block diagram illustrating an example alternate representation of the QAM modulator and upconverters of FIG. 7.

Based on equation (5), the QAM modulator and upconverters 700(k), k=0, . . . , MN−1, of FIG. 7, can be represented by the QAM modulator and upconverters 700'(k), k=0, . . . , MN−1, respectively, of FIG. 8.

Figure 9:
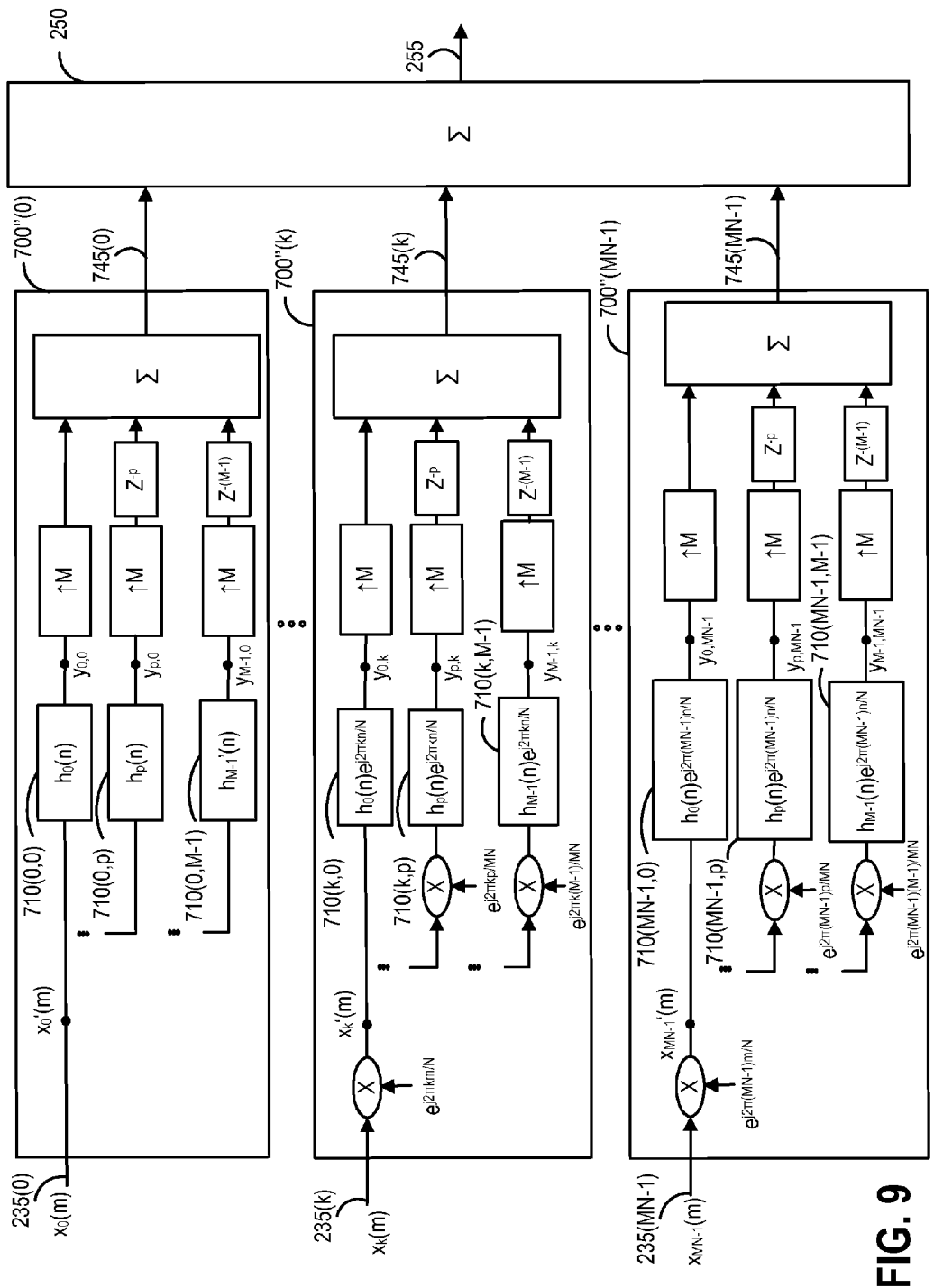
FIG. 9 is a block diagram illustrating polyphase filter bank representations of the QAM modulator and upconverters of FIG. 8.

The QAM modulator and upconverters 700'(k), k=0, . . . , MN−1, of FIG. 8 can be represented by the respective polyphase filter banks 700"(k), k=0, . . . , MN−1, respectively, of FIG. 9.

For each polyphase filter bank 700" (k), k=0, . . . , MN−1, $$h_p(n) e^{j\frac{2\pi}{N}kn} 710(k,p),$$

p=0, . . . , M−1, are the polyphase subfilters of $$h(n) e^{j\frac{2\pi}{MN}kn},$$

where $h_p$(n) are the polyphase subfilters of h(n). Unlike the polyphase subfilters $h_p$(n) 510(k, p), p=0, . . . , M−1, of the polyphase filter banks 240"(k) of FIG. 5, the polyphase subfilters $$h_p(n) e^{j\frac{2\pi}{N}kn} 710(k,p),$$

p=0, . . . , M−1, are not equivalent across the polyphase filter banks 700"(k). Accordingly, signals cannot be easily combined across the polyphase filter banks 700" (k).

To realize processing efficiency, the signals $y_{p,k}$(n) across the polyphase filters banks 700"(k) for the each phase, p, of the polyphase filters banks 700"(k) are combine to produce a signal $y_p$(n). That is, $$y_p(n) = \sum_{k=0}^{MN-1} y_{p,k}(n) \quad (6)$$

$$= \sum_{k=0}^{MN-1} \left( x'_k(n) e^{j\frac{2\pi}{MN}kp} \right) * \left( h_p(n) e^{j\frac{2\pi}{N}nk} \right)$$

where $x'_k(n) = x_k(n) e^{j\frac{2\pi}{N}kn}$ and * connotes convolution $$= \sum_{k=0}^{MN-1} \sum_{m=0}^{\infty} x'_k(n-m) e^{j\frac{2\pi}{MN}kp} h_p(m) e^{j\frac{2\pi}{MN}kMm}$$

$$= \sum_{m=0}^{\infty} \left( \sum_{k=0}^{MN-1} x'_k(n-m) e^{j\frac{2\pi}{MN}k(p+Mm)} \right) h_p(m)$$

$$= \sum_{m=0}^{\infty} X_{p+Mm}(n-m) h_p(m).$$

$X_{p+Mm}$(n−m) is the (p+Mm) mod MN IDFT/IFFT of the sequence [$x_0'$(m), . . . , $x_{MN-1}'$(m)] at time (n−m). Thus, in view of equation (6), the separate polyphase filter banks 700" (0), . . . , 700"(MN−1) of FIG. 9 can be replaced with the IDFT/IFFT processing unit 1000 of FIG. 10.

Figure 10:
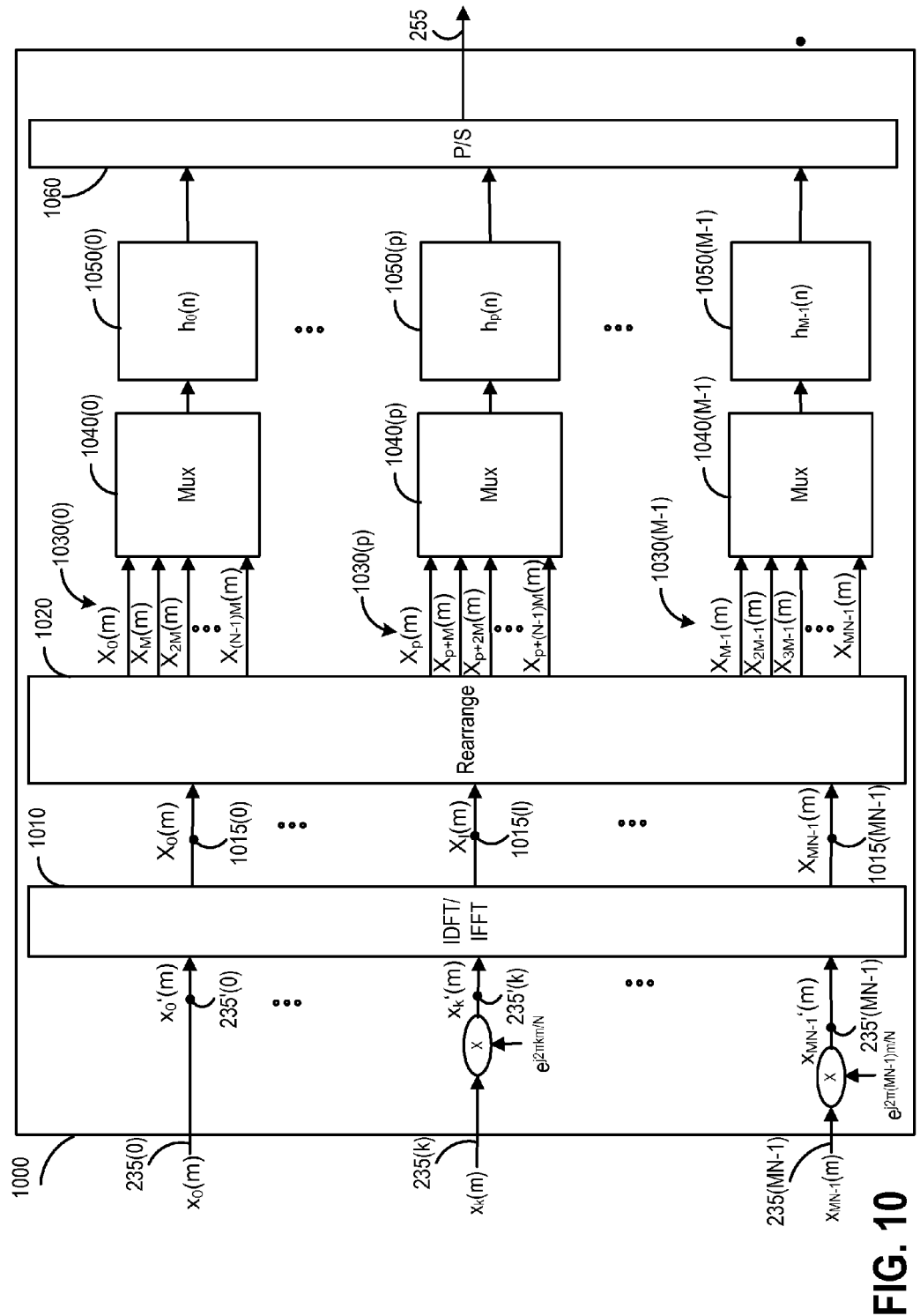
FIG. 10 is a block diagram illustrating an improved multi-channel QAM modulator using a IDFT/IFFT processing unit and polyphase filter bank.

Processing block 1010 of FIG. 10 produces an MN-point IDFT/IFFT $X_l$(m) 1015(I), I=0, . . . , MN−1, of the input sequence [$x_0'$(m) 235'(0), . . . , $x_{MN-1}'$(m) 235'(MN−1)]. The IFFT outputs $X_l$(m) 1015(l) then are rearranged to implement equation (6) for each phase, p, of the polyphase filters banks 700"(k). That is, for each phase, p, N IFFT outputs [$X_p$, $X_{p+M}$, $X_{p+2M}$, . . . , $X_{p+(N-1)M}$] 1030(p), p=0, . . . , M−1, are multiplexed together by multiplexer 1040(p) and filtered by the corresponding polyphase subfilter $h_p$(n) 1050(p) of filter h(n). The outputs of the polyphase subfilters $h_0$(n) 1050(0), . . . , $h_{M-1}$(n) 1050(M−1) then are serialized by, for example, a parallel-to-serial processor 1060 to generate the combined output multi-channel signal 255.

With the IDFT/IFFT processing unit 1000 of FIG. 10, the channel spacing between channels does not equal the input sample rate $f_s$ of the input signal 235(0), . . . , 235(MN−1). Thus, for example, it is not required to convert the sample rate of the QAM symbol streams 220(k) from 5.360537 MHz, for example, to 6 MHz as would be required for multi-channel QAM modulators using the IDFT/IFFT processing unit 600 of FIG. 6.

Implementations of the device of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

The processes and logic flows described in this specification can be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The invention claimed is:

1. A method comprising:
   modulating a plurality of quadrature amplitude modulated (QAM) symbol streams $x_k(m)$ onto a plurality of carrier signals respectively to produce a plurality of modulated carrier signals $x'_k(m)$, wherein the plurality of QAM symbol streams have a sample rate equal to $f_s$ and wherein the frequency $f_k$ of each of the plurality of carrier signals is an unique integer multiple of a fraction of the sample rate of the plurality of QAM symbol stream;
   producing a multi-point inverse Fourier transform (IDFT/IFFT) $X_j(m)$ of the plurality of modulated carrier signals $x'_k(m)$; and
   processing the multi-point IDFT/IFFT $X_j(m)$ using a plurality of polyphase subfilters $h_p(m)$ of an anti-imaging filter h(m).

2. The method of claim 1 further comprising serializing the outputs of the plurality of polyphase subfilters $h_p(m)$.

3. The method of claim 1:
   wherein modulating a plurality of QAM symbol streams $x_k(m)$ onto a plurality of carrier signals respectively to produce a plurality of modulated carrier signals $x'_k(m)$ comprises modulating a plurality of QAM symbol streams $x_k(m)$, k=0, . . . , MN−1, onto a plurality of carrier signals to produce a plurality of modulated carrier signals $x'_k(m)$, k=0, . . . , MN−1, respectively; and
   wherein the frequency $f_k$ of each of the plurality of carrier signal is $$k\frac{f_s}{N}$$

and where N is a nonzero integer.

4. The method of claim 3 wherein producing a multi-point IDFT/IFFT $X_j(m)$ of the plurality of modulated carrier signals $x'_k(m)$ comprising producing a MN-point IDFT/IFFT $X_j(m)$ of the plurality of modulated carrier signals $x'_k(m)$.

5. The method of claim 4 wherein processing the multi-point IDFT/IFFT $X_j(m)$ using a plurality of polyphase subfilters $h_p(m)$ of an anti-imaging filter h(m) comprises producing M outputs $y_p(n)$, p=0, . . . , M−1, where $$y_p(n) = \sum_{m=0}^{\infty} X_{p+Mm}(n-m)h_p(m)$$

where $X_{p+Mm}(n-m)$ is the (p+Mm) mod MN IDFT/IFFT of the plurality of modulated carrier signals $x'_k(m)$ at time (n−m).

6. The method of claim 5 wherein producing M outputs $y_p(n)$, p=0, . . . , M−1, where $$y_p(n) = \sum_{m=0}^{\infty} X_{p+Mm}(n-m)h_p(m)$$

comprises filtering M groups of N outputs of the MN IDFT/IFFT $[X_p, X_{p+M}, X_{p+2M}, \ldots, X_{p+(N-1)M}]$ for each p=0, . . . , M−1 by the corresponding polyphase subfilter $h_p(n)$.

7. A multi-channel modulator comprising:
   means for modulating a plurality of quadrature amplitude modulated (QAM) symbol streams $x_k(m)$ onto a plurality of carrier signals respectively to produce a plurality of modulated carrier signals $x'_k(m)$, wherein the plurality of QAM symbol streams have a sample rate equal to $f_s$ and wherein the frequency $f_k$ of each of the plurality of carrier signals is an unique integer multiple of a fraction of the sample rate of the plurality of QAM symbol stream;

means for producing a multi-point inverse Fourier transform (IDFT/IFFT) $X_i(m)$ of the plurality of modulated carrier signals $x'_k(m)$; and means for processing the multi-point IDFT/IFFT $X_i(m)$ using a plurality of polyphase subfilters $h_p(m)$ of an anti-imaging filter $h(m)$.

8. The multi-channel modulator of claim 7 further comprising means for serializing the outputs of the plurality of polyphase subfilters $h_p(m)$.

\* \* \* \* \*